United States Patent
Groth et al.

(10) Patent No.: US 6,281,322 B1
(45) Date of Patent: Aug. 28, 2001

(54) COATING COMPOSITIONS CONTAINING ALKOXYSILANES

(75) Inventors: Stefan Groth, Leverkusen; Reinhard Halpaap, Odenthal; Markus Mechtel, Köln; Lutz Schmalstieg, Köln; Philip E. Yeske, Köln, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/451,539

(22) Filed: Dec. 1, 1999

(30) Foreign Application Priority Data

Dec. 4, 1998 (DE) ............................... 198 55 999

(51) Int. Cl.$^7$ .................................................. C08G 77/26
(52) U.S. Cl. ................................ 528/28; 528/25; 528/38; 528/39; 528/44; 428/423.1; 428/447; 106/287.11
(58) Field of Search ........................... 528/25, 28, 38, 528/39, 44; 428/447, 423.1; 106/287.11

(56) References Cited

U.S. PATENT DOCUMENTS

| | | | |
|---|---|---|---|
| 3,856,156 | 12/1974 | Wagner et al. | 260/77.5 AQ |
| 3,886,226 * | 5/1975 | Asai et al. | . |
| 3,903,052 * | 9/1975 | Wagner et al. | . |
| 3,979,344 | 9/1976 | Bryant et al. | 260/18 TN |
| 4,031,120 * | 6/1977 | Gervase | . |
| 4,474,933 | 10/1984 | Huber et al. | 528/26 |
| 4,625,012 | 11/1986 | Rizk et al. | 528/28 |
| 4,628,076 * | 12/1986 | Chang et al. | 525/440 |
| 4,640,868 | 2/1987 | Penn | 428/446 |
| 5,109,057 * | 4/1992 | Tsuno et al. | 524/588 |
| 5,424,132 | 6/1995 | Bobrich et al. | 428/425.9 |
| 5,540,652 * | 7/1996 | Callinan et al. | 602/1 |
| 5,700,868 | 12/1997 | Hanada | 524/590 |
| 5,750,269 | 5/1998 | Park | 428/484 |
| 5,760,123 * | 6/1998 | Vogt-Birnbrich et al. | 524/500 |
| 5,854,338 * | 12/1998 | Hovestadt et al. | 524/591 |
| 5,919,860 * | 6/1999 | Roesler et al. | 524/838 |
| 5,945,476 * | 8/1999 | Roesler et al. | 524/588 |
| 5,952,445 * | 9/1999 | Roesler et al. | 528/28 |
| 6,001,214 * | 12/1999 | Hsieh et al. | 156/329 |
| 6,015,475 * | 1/2000 | Hsieh et al. | 156/331.4 |
| 6,057,415 * | 5/2000 | Roesler et al. | 528/28 |
| 6,096,823 * | 8/2000 | Shaffer | 524/590 |

FOREIGN PATENT DOCUMENTS

| | | |
|---|---|---|
| 498442 | 8/1992 | (EP) . |
| 576166 | 12/1993 | (EP) . |
| 695772 | 2/1996 | (EP) . |
| 2681072 | 3/1993 | (FR) . |
| 2747325 | 10/1997 | (FR) . |

* cited by examiner

*Primary Examiner*—Robert Dawson
*Assistant Examiner*—Jeffrey B. Robertson
(74) *Attorney, Agent, or Firm*—Joseph C. Gil; Thomas W. Roy

(57) ABSTRACT

The present invention relates to coating compositions containing 40 to 100% by weight, based on resin solids, of an alkoxysilyl-functional polyisocyanate polyurea which is reaction product of A) a polyisocyanate component having an average functionality of 2.5 to 5.5, an NCO content of 11.0 to 20.0% by weight and a monomeric diisocyanate content of less than 10% by weight, and containing at least 50% by weight of a polyisocyanate prepared from 4,4'-diisocyanatodicyclohexyl-methane with B) at least 0.7 equivalents, based on the equivalents of isocyanate groups, of an aminosilane corresponding to formula (I)

$$(RO)_n Y_{(3-n)} Si{-}CH_2CH_2CH_2{-}NHZ \qquad (I),$$

wherein
R represents methyl or ethyl,
Y represents methyl,
Z represents H, a $C_1$–$C_{12}$ alkyl or $CH_2CH_2CH_2{-}Si(OR)_n Y_{3-n}$, and
n is 1, 2 or 3, and C) optionally other isocyanate-reactive compounds. The present invention also relates the hydrolyzates/condensates that are prepared by adding water or an aqueous solution of a catalyst to the coating compositions according to the invention.

18 Claims, No Drawings

COATING COMPOSITIONS CONTAINING ALKOXYSILANES

BACKGROUND OF THE INVENTION

1. Field of the Invention

The present invention relates to coating compositions, which preferably dry at room temperature, contain alkoxysilane groups and are based on polyisocyanates prepared from 4,4'-diisocyanatodicyclohexyl-methane, and to their use as a protective coating.

2. Description of the Prior Art

Damage to coatings due to the penetration of dyes, caused by graffiti, for example, constitutes an increasing problem. Conventional organic coatings swell due to the solvent contained in the lacquer spray and, thus, can readily be penetrated by dyes. It is then no longer possible to clean the surface without destroying the coating.

Therefore, there is a need for coatings which form an effective barrier to solvents and dyes and which thus protect the underlying substrate from contamination.

Coatings that can be removed with the dye or with the contaminant (e.g. FR-A 2,747,325, WO 97/24407), do provide satisfactory protection, but involve considerable cost, since they have to be freshly applied again and again.

Permanent coatings can be treated with silicone polymers or fluoropolymers in order to decrease their surface energy (e.g. EP-A 695 772, FR-A 2,681,072), so that wetting of the surface is made more difficult. A disadvantage of this treatment is that the fluoro- or silicone polymers, which are not chemically bonded, are washed out over time due to weathering effects and lose their effectiveness. In contrast, chemically bound polymers result in incompatibility effects, haze effects and poor adhesion to the substrate, so that decorative clear coatings, which exhibit a high level of transparency, cannot be treated in this manner.

In contrast, ultra-hard sol-gel coatings (e.g. EP-A 576 166) provide good protection from graffiti. However, these systems have to be stoved at elevated temperatures, so that they are unsuitable for use for coating large vehicles, for example. Also, these coating compositions exhibit poor adhesion, particularly to other coatings, and often exhibit unsatisfactory resistance to the impact of stones.

Reaction products of aminosilanes with polyisocyanates (silane-functional ureas) are known and can be used, for example, for the production of flexible coatings (U.S. Pat. Nos. 5,700,868, 4,625,012, 4,474,933, 3,979,344, DE-A 4,234,325, DE-A 2,155,259). Since these products for the most part are based on high molecular weight polymers and their density of crosslinking is low, these coatings are less suitable as protective coatings against color-imparting liquids. In principle, however, silicone-functional ureas can be used for the production of sol-gel coatings with a high density of crosslinking. Their disadvantages are their tendency to crystallize, which is often pronounced, and/or their rate of hardening at room temperature, which is often so low that an efficient protective coat has not formed even several days after application.

An object of the present invention is to provide a protective coating which preferably does not have to be stoved and 24 hours after application at room temperature has hardened to such an extent that the penetration of dyes (e.g. graffiti) is effectively prevented. An additional object is to provide a coating that has good visual quality and exhibits good scratch resistance such that it is suitable for use an automotive coating.

These objects may be achieved in accordance with the siloxane-curing coatings of the present invention, which are based on highly functional 4,4'-diisocyanato-dicyclohexylmethane polyisocyanates and form an efficient barrier layer against dyes from graffiti within 24 hours after application. These coatings can be applied to any substrate, exhibit good scratch resistance, and provide effective protection from contaminants.

SUMMARY OF THE INVENTION

The present invention relates to coating compositions containing 40 to 100% by weight, based on resin solids, of an alkoxysilyl-functional polyisocyanate polyurea which is reaction product of A) a polyisocyanate component having an average functionality of 2.5 to 5.5, an NCO content of 11.0 to 20.0% by weight and a monomeric diisocyanate content of less than 10% by weight, and containing at least 50% by weight of a polyisocyanate prepared from 4,4'-diisocyanatodicyclohexyl-methane with B) at least 0.7 equivalents, based on the equivalents of isocyanate groups, of an aminosilane corresponding to formula (I)

$$(RO)_n Y_{(3-n)}Si\text{—}CH_2CH_2CH_2\text{—}NHZ \qquad (I),$$

wherein
R represents methyl or ethyl,
Y represents methyl,
Z represents H, a $C_1$–$C_{12}$ alkyl or $CH_2CH_2CH_2$—Si$(OR)_n Y_{3-n}$, and
n is 1, 2 or 3, and C) optionally other isocyanate-reactive compounds.

The present invention also relates the hydrolyzates/condensates that are prepared by adding water or an aqueous solution of a catalyst to the coating compositions according to the invention.

DETAILED DESCRIPTION OF THE INVENTION

Component A) has an average NCO functionality of 2.5 to 5.5, preferably 2.8 to 5.0 and more preferably 3.0 to 4.5; an NCO content, based on solids, of 11.0 to 20.0% by weight, preferably 11.5 to 17.0% by weight and more preferably 12.0 to 16.0% by weight; and a monomeric diisocyanate content of less than 10% by weight, preferably less than 2.0% by weight and more preferably less than 0.5% by weight. More than 50% by weight, preferably more than 70% by weight and more preferably more than 80% by weight of the isocyanates used to prepare the compounds present in component A) are prepared from 4,4'-diisocyanatodicyclohexylmethane.

Any polyisocyanates prepared from 4,4'-diisocyanatodicyclohexylmethane can be used for the production of component A), such as biurets, isocyanurates (trimers), iminooxadiazine diones, uretdiones, allophanates and addition products with low molecular weight polyfunctional alcohols such as trimethylolpropane, 1,6-hexanediol, 1,5-pentanediol, diethylene glycol, triethylene glycol, 2,2,4-trimethyl-1,3-propanediol, neopentyl glycol and mixtures thereof.

Isocyanurate (trimers) prepared from 4,4'-diisocyanatodicyclohexyl-methane are preferred, especially those having an NCO content of 12 to 16% by weight, an NCO functionality of 3.0 to 4.5 and a monomer content of <2% by weight. The trimers can be produced by a trimerization process as described, e.g., in EP-A 330 996.

Component A) may also contain other di- or polyisocyanates, for example, monomeric diisocyanates such as 1,4-butane diisocyanate, 1,6-hexane diisocyanate (HDI), 3-isocyanatomethyl-3,3,5-trimethylcyclohexyl isocyanate (isophorone diisocyanate or IPDI), 2-methyl-1,5-pentane diisocyanate, 2,2,4-trimethyl-hexamethylene diisocyanate (TMDI), 1,12-dodecane diisocyanate and bis(isocyanatomethyl)norbornane; triisocyanates such as 4-isocyanatomethyl-1,8-octane diisocyanate; and polyisocyanates which can be prepared from these isocyanate starting materials, such as those which are described in J. prakt. Chem. 1994, 336, 185–200 and Lackharze, Chemie, Eigenschaften and Anwendungen, edited by D. Stoye and W. Freitag, Hanser Verlag, Munich, Vienna 1996. The mixtures should satisfy the preceding requirements regarding NCO content, NCO functionality and monomer content.

In order to make them easier to handle, polyisocyanate mixtures A) can be thinned with up to 50% by weight of known coating solvents. Suitable solvents include those which are not reactive with NCO groups, such as butyl acetate, ethyl acetate, 1-methoxy-2-propyl acetate, toluene, 2-butanone, xylene, 1,4-dioxane, N-methylpyrrolidone, dimethylacetamide, dimethylformamide and dimethyl sulphoxide.

Polyisocyanates A) are reacted with at least 0.7 equivalents, preferably with at least 0.8 equivalents and more preferably with at least 0.9 equivalents, based on the equivalents of isocyanate groups, of an aminosilane corresponding to formula (I)

$$(RO)_nY_{(3-n)}Si—CH_2CH_2CH_2—NHZ \qquad (I),$$

wherein

R represents methyl or ethyl,

Y represents methyl,

Z represents H, a $C_1$–$C_{12}$ alkyl or $CH_2CH_2CH_2$—$Si(OR)_nY_{3-n}$, and n is 1, 2 or 3.

Examples of aminosilanes which can be used include 3-aminopropyltrimethoxysilane, 3-aminopropyltriethoxysilane, bis(3-trimethoxysilylpropyl)amine, 3-aminopropylmethyldiethoxysilane and 3-(N-methyl-amino)-propyl-trimethoxysilane. Preferred aminosilanes are 3-aminopropyltrimethoxy-silane and 3-aminopropyltriethoxysilane. Mixtures of different aminosilanes can also be used.

The remaining NCO equivalents can optionally be reacted with isocyanate-reactive compounds C), e.g., low molecular weight alcohols such as aliphatic $C_1$ to $C_8$ alcohols and $C_5$ to $C_6$ cycloaliphatic alcohols; and/or aliphatic $C_1$ to $C_8$ amines or $C_5$ to $C_6$ cycloaliphatic amines. In addition, blocking agents such as butanone oxime, 3,5-dimethylpyrazole, diethyl malonate or ε-caprolactam can be used. It is also possible to react the remaining NCO equivalents with low and high molecular weight polyhydroxyl compounds such as polyethers, polyesters or polycarbonates. If these polyols are used, the reaction with these compounds is preferably carried out before the reaction with the aminosilane. In a preferred embodiment polyols are used in addition to the aminosilanes, but 0 to 5 equivalent percent of all the starting NCO groups are reacted with a low molecular weight monoalcohol, which is used as a solvent.

Suitable high molecular weight polyhydroxyl compounds include the hydroxypolyesters, hydroxypolyethers, hydroxypolythioethers, hydroxypolyacetals, hydroxypolycarbonates, dimeric fatty alcohols and/or ester amides which are known from polyurethane chemistry and have number average molecular weights, $M_n$, from 400 to 8000, preferably 500 to 6500.

Suitable low molecular weight polyhydroxyl compounds are known from polyurethane chemistry and have molecular weights from 62 to 399, such as ethylene glycol, triethylene glycol, tetraethylene glycol, 1,2- and 1,3-propanediol, 1,4- and 1,3-butanediol, 1,6-hexanediol, 1,8-octanediol, neopentyl glycol, 1,4-bis(hydroxymethyl)cyclohexane, bis(hydroxymethyl)tricyclo[5.2.1.02.6]decane, 1,4-bis(2-hydroxyethoxy)benzene, 2-methyl-1,3-propanediol, 2,2,4-trimethylpentanediol, 2-ethyl-1,3-hexanediol, dipropylene glycol, polypropylene glycols, dibutylene glycol, polybutylene glycols, bisphenol A, tetrabromobisphenol A, glycerol, trimethylolpropane, 1,2,6-hexanetriol, 1,2,4-butanetriol, pentaerythritol, chinitol, mannitol, sorbitol, methyl glycoside and 4,3,6-dianhydrohexite.

Examples of suitable polyether polyols are known from polyurethane chemistry and include addition compounds or mixed addition compounds of tetrahydrofuran, styrene oxide, ethylene oxide, propylene oxide, butylene oxide or epichlorohydrin, particularly ethylene oxide and/or of propylene oxide, which are produced using divalent to polyvalent starter molecules such as water or the previously described polyols or amines having 1 to 4 NH bonds.

Examples of suitable polyester polyols include the reaction products of polyhydric alcohols, preferably of dihydric alcohols optionally in admixture with trihydric alcohols, with polybasic carboxylic acids, preferably dibasic carboxylic acids. Instead of free polycarboxylic acids, the corresponding polycarboxylic acid anhydrides or corresponding polycarboxylic acid esters of low molecular weight alcohols or mixtures thereof can be used for the production of the polyesters.

The polycarboxylic acids may be aliphatic, cycloaliphatic, aromatic and/or heterocyclic, and can optionally be unsaturated or substituted, e.g., by halogen atoms. Examples include adipic acid, phthalic acid, isophthalic acid, succinic acid, suberic acid, azelaic acid, sebacic acid, trimellitic acid, phthalic anhydride, tetrahydrophthalic anhydride, glutaric anhydride, tetrachlorophthalic anhydride, endomethylene-tetrahydrophthalic anhydride, maleic anhydride, maleic acid, fumaric acid, dimeric and trimeric fatty acids (such as oleic acid, optionally in admixture with monomeric fatty acids), terephthalic acid dimethyl ester and terephthalic acid bis-glycol ester. The previously described polyols are suitable as polyhydric alcohols.

Suitable polycarbonate polyols can be obtained by the reaction of carbonic acid derivatives, e.g. diphenyl carbonate or phosgene, with diols. Examples of suitable diols include ethylene glycol, triethylene glycol, tetraethylene glycol, 1,2- and 1,3-propanediol, 1,4- and 1,3-butanediol, 1,5-pentanediol, 1,6-hexanediol, 1,8-octanediol, neopentyl glycol, 1,4-bis(hydroxymethyl)cyclohexane, bis(hydroxymethyl)tricyclo-[5.2.1.02.6]decane, 1,4-bis(2-hydroxyethoxy)benzene, 2-methyl-1,3-propanediol, 2,2,4-trimethylpentanediol, dipropylene glycol, polypropylene glycols, dibutylene glycol, polybutylene glycols, bisphenol A and tetrabromobisphenol A or mixtures of said diols.

The diol component preferably contains 40 to 100% by weight of hexanediol, preferably 1,6-hexanediol, and/or hexanediol derivatives. Suitable derivatives are those which in addition to terminal OH groups contain ether or ester groups, e.g., products which are obtained by the reaction of 1 mole of hexanediol with at least 1 mole, preferably 1 to 2 moles, of caprolactone according to DE-A 1,770,245, or by the self-etherification of hexanediol to form di- or trihexamethylene glycol. The production of these derivatives is known from DE-A 1,570,540, for example. The polyether-polycarbonate diols described in DE-A 3,717,060 can also be used.

The hydroxypolycarbonates should be substantially linear. However, they may optionally be slightly branched by the incorporation of polyfunctional components, particularly low molecular weight polyols. Examples of polyols which are suitable for this purpose include 1,2,6-hexanetriol, glycerol, 1,2,4-butanetriol, pentaerythritol, chinitol, mannitol, sorbitol, methyl glycoside and 4,3,6-dianhydrohexite.

Suitable polyethers are propylene oxide polyethers containing an average of 2 to 3 hydroxyl groups and up to a maximum of 50% by weight of incorporated polyethylene oxide units. The polyethers have number average molecular weights of 200 to 9000. Also suitable are difunctional tetrahydrofuran polyethers which have average molecular weights of 200 to 4000, and polypropylene oxide polyethers with a maximum total degree of unsaturation of 0.04 milliequivalents and a number average molecular weight, calculated from their OH content and functionality, of 2000 to 12,000.

Polyether polyols with a low degree of unsaturation are known and described, for example, in EP-A 283 148, U.S. Pat. Nos. 3,278,457, 3,427,256, 3,829,505, 4,472,560. 3,278,458, 3,427,334, 3,941,849, 4,721,818, 3,278,459, 3,427,335 and 4,355,188. The key to the production of polyether polyols having a low degree of unsaturation is catalysis with metal cyanides.

The coating compositions according to the invention contain 40 to 90% by weight, preferably 50 to 80% by weight, based on resin solids, of the silane-functional polyisocyanate polyureas according to the invention and up to 60% by weight, preferably 20 to 50% by weight, based on resin solids, of a silane corresponding to formula (II)

$$QSi(OX)_3 \qquad (II),$$

wherein

X represents methyl, ethyl, isopropyl or butyl and

Q represents hydrogen, $C_1$ to $C_8$ alkyl, phenyl, methoxy, ethoxy, 3-glycidyloxy-propyl, 3-aminopropyl or 3-methacroyloxy-propyl, or hydrolyzates/condensates obtained from the silanes of formula (II).

The coating compositions also contain 40 to 95%, preferably 60 to 90%, of the known solvents from coating chemistry. Preferred solvents are aliphatic alcohols such as ethanol, i-propanol, n-propanol, n-butanol, i-butanol, sec-butanol and tert-butanol; and ether alcohols such as 1-methoxy-2-propanol and $C_1$ to $C_4$ glycol monoalkyl ethers. Dipolar solvents can also be used, such as N-methylpyrrolidone, dimethylacetamide, dimethylformamide, dimethyl sulphoxide and dioxane. Aromatic solvents, such as toluene or xylene, can also be used in admixture with alcohols. Esters and ether esters, such as ethyl acetate, butyl acetate or methoxypropyl acetate, are also suitable. Water can also be used, although in most cases it is only useful to add water shortly before processing, if hydrolysis is to be effected in order to form a sol ready for coating.

Various procedures are possible for producing the coating compositions according to the invention. Polyisocyanate mixture A) may be diluted with a solvent and added dropwise at temperatures between 25 and 30° C. and with cooling to aminosilane B) which is diluted in a solvent. It has been shown that the use of alcohols and/or strongly polar solvents helps to prevent precipitation and crystallization. If alcohols are used, they are preferably introduced together with the amine component. To prevent an excess of amine, which may cause problems, it is advantageous to use the amine component in an amount which is less than stoichiometric. Component B) and optionally the catalyst are added after the reaction.

The coating compositions according to the invention are preferably used as sol-gel coating compositions. In these coating compositions a portion of the alkoxysilyl groups have been hydrolyzed with water before the application of the coating. These hydrolyzed groups are capable of condensing to form siloxane groups. (See Sol-Gel Science: The physics and chemistry of Sol-Gel Processing. Academic Press New York 1990.)

In order to produce the sol-gel coating composition, 0.5 to 25% by weight, preferably 2 to 20% by weight, based on the weight of the coating composition, of water, optionally together with a hydrolysis catalyst, is added to the coating compositions according to the invention. Examples of suitable hydrolysis catalysts are described by W. Noll in Chemie und Technologie der Silikone, VCH-Verlag 1968. Examples include acids such as hydrochloric acid, sulphuric acid, p-toluenesulphonic acid, trifluoroacetic acid, acetic acid and formic acid. Up to 2%, preferably up to 0.5%, based on resin solids, of acid can be used.

After the addition of the aqueous catalyst, the mixture is allowed to react for about 1 hour at room temperature. Then the sol, which is usually a 10 to 40% sol, can be applied by known methods such as spraying, flooding, doctor blade application or dipping. The use of a primer is also possible for special applications.

The pot life of the ready-for-coating mixture ranges from 2 to 24 hours, depending on the type and amount of catalyst and on the polyisocyanate mixture used.

The coatings produced, which are preferably 2 to 24 μm thick, generally attain a satisfactory degree of hardness after 24 hours at room temperature, so that they are capable of effectively preventing the penetration of dyes from simulated graffiti, such as a blue permanent marker or a 1% solution of fuchsin in ethanol. For special applications, e.g., in the automobile sector, hardening can also be effected at higher temperatures.

The coatings according to the invention can also be prepared in known manner as air-drying coatings without the addition of water.

Any substrates can be sealed with the coating according to the invention, such as plastics (e.g. polycarbonate, polyamide, polyester, ABS, polystyrene, PPO polyamide blends and PPS), coatings (previously coated surfaces), marble, granite, metals, wood, leather and textiles.

The invention is further illustrated but is not intended to be limited by the following examples in which all parts and percentages are by weight unless otherwise specified.

EXAMPLES

During tests for resistance to acetone and ethanol, the film was assessed after contact for 5 minutes according to the following criteria:

| | |
|---|---|
| 0 | unaltered |
| 1 | very slightly altered |
| 2 | slightly altered |
| 3 | moderately altered |

| | |
|---|---|
| 4 | strongly altered |
| 5 | film destroyed. |

A 1% ethanolic fuchsin (violet dye) solution and a blue permanent marker (Edding 850) were used to simulate contamination with graffiti. After a period of action of 15 minutes, the dyes were removed with isopropanol.

The resistance was subsequently assessed according to the following criteria:

| | |
|---|---|
| 0 | no traces |
| 1 | slight color shadow |
| 2 | slight staining |
| 3 | clear staining without surface damage |
| 4 | clear staining with a discernible edge |
| 5 | film destroyed after wiping the surface |

Example 1

2620 g of 4,4'-diisocyanatodicyclohexylmethane were trimerized to give an NCO content of 26.8% at 60° C. with 6 g of a 10% catalyst solution of trimethylbenzylammonium hydroxide dissolved in 2-ethylhexanol:methanol (5:1), at a temperature of 60–75° C. 0.5 g of bis(2-ethylhexyl) phosphate were added in order to terminate the trimerization reaction. The clear crude solution was then mixed with 130 g of an isocyanurate polyisocyanate based on diisocyanato-hexane (HDI), which was obtained according to Example 12 of EP-A 330 966, and 4,4'-diisocyanato-dicyclohexyl-methane monomer was separated by thin-film distillation at 200° C./0.15 mbar. A light, slightly yellowish solid resin was obtained which had an NCO content of 15.1%, a melting point of about 100° C., a content of monomeric diisocyanate of <0.2% and an average NCO functionality of 3.5 as calculated from the NCO content. The solid resin was subsequently dissolved in butyl acetate to form a 70% solution.

Example 2

21.7 g (0.098 mole) of 3-aminopropyltrimethoxysilane were diluted with 252 g of ethanol. 39.2 g (0.1 equivalent) of the 70% solution of trimer from Example 1 were mixed with 15.7 g of N-methylpyrrolidone and added dropwise at 25–30° C. and with cooling to the amine solution. Finally, the solution was allowed to stand at room temperature until the NCO band in the IR spectrum disappeared. Then 20.7 g of tetraethoxysilane were added. A solution was obtained which was storage stable and had a solids content of 20%.

In order to obtain the ready-for-coating sol, 14 g of 0.0067 N hydrochloric acid were added to 100 g of the above solution, which was allowed to stand for 1 hour. The sol was subsequently applied to a glass plate using a 30 μm doctor blade and was allowed to harden for 24 hours at room temperature.

Example 3

21.7 g (0.098 mol) of 3-aminopropyltrimethoxysilane were diluted with 107 g of ethanol. 39.2 g (0.1 equivalent) of the 70% solution of trimer from Example 1 were mixed with 15.7 g of N-methylpyrrolidone and added dropwise at 25–30° C. and with cooling to the amine solution. Finally, the solution was allowed to stand at room temperature until the NCO band in the IR spectrum disappeared. Then 20.7 g of tetraethoxysilane were added. A solution was obtained which was storage stable and had a solids content of 34%.

A coating was prepared as described in Example 2.

The properties of the products from Examples 2 and 3 are summarized in the following Table.

TABLE 1

| Example | 2 | 3 |
|---|---|---|
| solids content | 17.5% | 29.8% |
| film appearance | clear | slight haze |
| 24 hours | | |
| acetone | 0 | 0 |
| ethanol | 0 | 0 |
| fuchsin solution | 0 | 1 |
| blue marker | 0 | 0 |
| 48 h | | |
| acetone | 0 | 0 |
| ethanol | 0 | 0 |
| fuchsin solution | 0 | 0 |
| blue marker | 0 | 0 |

Examples 4 to 8

Examples 4 to 6 are examples according to the invention, while Examples 7 and 8 are comparison examples. The components were mixed in the given sequence and were allowed to stand for 1 hour after adding hydrochloric acid. The sol was subsequently applied to a glass plate using a 30 μm doctor blade. The films were assessed after drying at room temperature for 24 hours and 48 hours.

Component A 21.7 g (0.098 mol) of 3-aminopropyltrimethoxysilane were diluted with 21.7 g of ethanol. 39.2 g (0.1 equivalent) of the 70% solution of trimer from Example 1 were mixed with 15.7 g of N-methylpyrrolidone and added dropwise at 25–30° C. and with cooling to the amine solution. Finally, the solution was allowed to stand at room temperature until the NCO band in the IR spectrum disappeared. Then 20.7 g of tetraethoxysilane were added. A solution was obtained which was storage stable and had a solids content of 50%, and contained 82.3% of the addition product of 4,4'-diisocyanatodicyclohexyl-methane trimer and aminosilane and 17.7% of the addition product of HDI trimer and aminosilane.

Component B 21.7 g (0.098 mol) of 3-aminopropyltrimethoxysilane were diluted with 267 g of ethanol. 19.6 g (0.1 equivalent) of an HDI trimer were treated with 19.6 g of N-methylpyrrolidone and added dropwise at 25–30° C. and with cooling to the amine solution. Finally, the solution was allowed to stand at room temperature until the NCO band in the IR spectrum disappeared. A clear solution of the addition product of HDI trimer and aminosilane was obtained, which had a solids content of 12.5%.

The following Table demonstrates the properties of the products according to the invention.

TABLE 2

| Example | 4 | 5 | 6 | 7* | 8* |
|---|---|---|---|---|---|
| component A | 24.7 | 19.78 | 14.83 | 9.89 | 4.94 |
| component B | 0 | 16.48 | 32.96 | 49.44 | 65.92 |
| Amt. of HDI trimer | 17.7% | 31.9% | 47.1% | 63.4% | 81.0% |

TABLE 2-continued

| Example | 4 | 5 | 6 | 7* | 8* |
|---|---|---|---|---|---|
| addition product |  |  |  |  |  |
| ethanol | 57.7 | 46.14 | 34.61 | 23.07 | 11.54 |
| tetraethoxysilane | 5.2 | 5.2 | 5.2 | 5.2 | 5.2 |
| 0.0067N hydrochloric acid | 12.3 | 12.3 | 12.3 | 12.3 | 12.3 |
| film appearance | clear | slight haze | slight haze | moderate haze | strong haze |
| 24 hours |  |  |  |  |  |
| acetone | 0 | 0 | 0 | 0 | 2 |
| ethanol | 0 | 0 | 0 | 2 | 2 |
| fuchsin solution | 0 | 1 | 1 | 3 | 5 |
| blue marker | 0 | 0 | 0 | 0 | 0 |
| 48 hours |  |  |  |  |  |
| acetone | 0 | 0 | 0 | 0 | 2 |
| ethanol | 0 | 0 | 0 | 0 | 2 |
| fuchsin solution | 0 | 0 | 0 | 0 | 4 |
| blue marker | 0 | 0 | 0 | 0 | 0 |

*comparison example

Example 9

Comparison Example

A two-component polyurethane clear coating comprising based on Desmophen A665 polyol and Desmodur N3390 polyisocyanate (HDI trimer) (NCO/OH=1, 50% solids content, 0.2% dibutyltin dilaurate) was applied to a glass plate using a 120 μm doctor blade and dried overnight at 60° C. The resistance of the film to ethanol, acetone, fuchsin solution and to the blue marker was tested after 24 hours. The scratch resistance was tested after storage for 48 hours at room temperature using a Rotahub Scratchtester supplied by Bayer (scratching medium Agfa 701 copier paper, contact force 0.7 N, sample disc diameter 70 mm, disc speed 197 rpm, stroke speed 2 m/minute). The gloss (20°) was determined according to DIN 67530. The haze was determined according to ISO/CD 13803.

Example 10

According to the Invention

The ready-for-coating sol described in Example 2 was applied, analogously to Example 2, to the polyurethane clear coat from described in Example 9. The scratch resistance and resistance to chemicals were tested analogously to Example 9.

Example 11

Comparison Example 600 g of 4,4'-diisocyanatodicyclohexylmethane (Desmodur W, a commercial product supplied by Bayer AG) were degassed under vacuum and treated with 500 ppm of Ionol. The batch was subsequently heated to 60° C. and 0.6 g of a 10% solution of benzyltrimethylammonium hydroxide in 1-butanol were added. After the NCO content had fallen to 28.5%, a further 0.3 g of the catalyst was added and the temperature was increased to 68° C. When an NCO content of 25.4% was reached, 0.15 g of dibutyl phosphate were added as a reaction terminating agent, and the batch was diluted with 257.7 g of N-methylpyrrolidone and cooled to room temperature. A trimerized-on 4,4'-diisocyanatodicyclohexylmethane trimer was obtained, which had an average functionality of 2.2 and a content of free 4,4'-diisocyanatodicyclohexylmethane of 58.5%.

21.7 g (0.098 mol) of 3-aminopropyltrimethoxysilane were diluted with 210 g of ethanol. 23.62 g (0.1 equivalent) of the above solution of trimer were added dropwise to the amine solution at 25–30° C. and with cooling. Finally, the solution was allowed to stand at room temperature until the NCO band in the IR spectrum disappeared. Thereafter, 16.0 g of tetraethoxysilane were added. A solution was obtained which had a solids content of 20%.

In order to obtain the ready-for-coating sol, 14 g of 0.0067N hydrochloric acid were added to 100 g of the above solution, which was allowed to stand for 1 hour. The sol was subsequently applied to a glass plate using a 30 μm doctor blade and was allowed to harden for 24 hours at room temperature. The scratch resistance and resistance to chemicals were tested analogously to Example 9.

The resistance properties of the products from Comparison examples 9 and 11 and Example 10 (according to the invention) were tested and are set forth below.

TABLE 3

| Example | 9* | 10 | 11* |
|---|---|---|---|
| NCO functionality of the initial polyisocyanate | — | 3.5 | 2.2 |
| film appearance | clear | clear | clear |
| acetone | 1 | 0 | 0 |
| ethanol | 3 | 0 | 2 |
| fuchsin solution | 4 | 0 | 3 |
| Edding ® 850 | 3 | 0 | 1 |
| Scratch resistance test in the Rota-Hub apparatus |  |  |  |
| initial gloss[1] | 91.1 | 87.1 | 87.0 |
| final gloss after 30 strokes[1] | 75.6 | 86.5 | 81.0 |
| Δ gloss[1] | 15.5 | 0.6 | 6.0 |
| initial haze[2] | 6.0 | 7.7 | 7.9 |
| final haze after 30 strokes[2] | 48.2 | 9.5 | 15.3 |

*comparison example
[1]DIN 67530
[2]DIN ... ISO/CD13803

It is apparent from Comparison example 11 that reduced functionality has a negative effect on properties. Therefore, only 4,4'-diisocyanatodicyclohexylmethane polymers are suitable for the present invention.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:
1. A coating composition containing
 I) 50 to 80% by weight, based on resin solids of components I) and II), of an alkoxysilyl-functional polyisocyanate polyurea which is the reaction product of
  A) a polyisocyanate component having an average functionality of 2.5 to 5.5, an NCO content of 11.0 to 20.0% by weight and a monomeric diisocyanate content of less than 10% by weight, and containing at least 50% by weight of a polyisocyanate prepared from 4,4'-diisocyanatodicyclohexyl-methane with
  B) at least 0.7 equivalents, based on the equivalents of isocyanate groups, of an aminosilane corresponding to formula (I)

$(RO)_n Y_{(3-n)} Si-CH_2CH_2CH_2-NHZ$  (I), wherein
R represents methyl or ethyl,
Y represents methyl,
Z represents H, a $C_1$–$C_{12}$ alkyl or $CH_2CH_2CH_2$—$Si(OR)_nY_{3-n}$, and
n is 1, 2 or 3, and
C) optionally other isocyanate-reactive compounds, and II) 20 to 50% by weight, based on resin solids of components I) and II), of a silane corresponding to formula (II)

$$QSi(OX)_3 \qquad (II),$$

wherein
X represents methyl, ethyl, isopropyl or butyl and
Q represents hydrogen, $C_1$ to $C_8$ alkyl, phenyl, methoxy, ethoxy, 3-glycidyloxy-propyl, 3-aminopropyl or 3-methacroyloxy-propyl,
or a hydrolyzate/condensate obtained from the silane of formula (II).

2. The coating composition of claim 1 wherein 0 to 5 equivalent percent of the starting NCO groups are reacted with a low molecular weight monoalcohol.

3. The coating composition of claim 1 wherein polyisocyanate component A) contains at least 70% by weight of the trimer (isocyanurate) of 4,4'-diisocyanatodicyclohexylmethane.

4. The coating composition of claim 1, wherein component A) has an average functionality of greater than 2.8 and a monomeric diisocyanate content of less than 2.0% by weight.

5. The coating composition of claim 3, wherein component A) has an average functionality of greater than 2.8 and a monomeric diisocyanate content of less than 2.0% by weight.

6. The coating composition of claim 1, wherein component A) has an average functionality of greater than 3.0 and a monomeric diisocyanate content of less than 0.5% by weight.

7. The coating composition of claim 1 wherein component B) comprises 3-aminopropyl-triethoxysilane and/or 3-aminopropyltrimethoxy-silane.

8. The coating composition of claim 3 wherein component B) comprises 3-aminopropyl-triethoxysilane and/or 3-aminopropyltrimethoxy-silane.

9. The coating composition of claim 5 wherein component B) comprises 3-aminopropyl-triethoxysilane and/or 3-aminopropyltrimethoxy-silane.

10. The coating composition of claim 1 wherein polyisocyanate component A) is reacted with at least 0.8 equivalents of component B).

11. The coating composition of claim 1 wherein said silane of formula II comprises tetraethoxysilane or a hydrolyzate/condensate obtained from tetraethoxysilane.

12. The coating composition of claim 3 wherein said silane of formula II comprises tetraethoxysilane or a hydrolyzate/condensate obtained from tetraethoxysilane.

13. The coating composition of claim 5 wherein said silane of formula II comprises tetraethoxysilane or a hydrolyzate/condensate obtained from tetraethoxysilane.

14. The coating composition of claim 7 wherein said silane of formula II comprises tetraethoxysilane or a hydrolyzate/condensate obtained from tetraethoxysilane.

15. The coating composition of claim 8 wherein said silane of formula II comprises tetraethoxysilane or a hydrolyzate/condensate obtained from tetraethoxysilane.

16. The coating composition of claim 9 wherein said silane of formula II comprises tetraethoxysilane or a hydrolyzate/condensate obtained from tetraethoxysilane.

17. A sol-gel coating composition containing the coating composition of claim 1 and water or an aqueous solution of a hydrolysis catalyst.

18. A coating, plastic, granite, marble, metal, wood, leather or textile coated with the coating composition of claim 1.

* * * * *